United States Patent [19]
Bridges

[11] Patent Number: 5,499,658
[45] Date of Patent: Mar. 19, 1996

[54] ANGLED SEAT VALVE AND FITTING APPARATUS

[76] Inventor: Willard P. Bridges, 2102 W. Club Rd., Duncan, Okla. 73533

[21] Appl. No.: 108,101

[22] Filed: Aug. 16, 1993

[51] Int. Cl.$^6$ .............................. F16K 1/02; F16K 31/44
[52] U.S. Cl. ..................... 137/886; 251/229; 251/266; 251/274; 251/279; 251/298; 251/333
[58] Field of Search .................... 137/883, 886, 137/875; 251/229, 266, 267, 274, 298, 299, 358, 333, 279, 303

[56] References Cited

U.S. PATENT DOCUMENTS

| | | | |
|---|---|---|---|
| 178,311 | 6/1876 | Leland | 137/269 |
| 330,377 | 11/1885 | Coffin | 137/307 |
| 496,187 | 4/1893 | Clark | 137/272 |
| 695,046 | 3/1902 | Granton | 251/298 |
| 1,020,022 | 3/1912 | Burke | 251/298 X |
| 1,145,249 | 7/1915 | Larocca | 137/875 |
| 1,156,326 | 10/1915 | Stiers | 251/298 |
| 1,172,298 | 2/1916 | Morris | 251/145 |
| 1,585,951 | 5/1926 | Waller | 137/875 |
| 1,786,969 | 12/1930 | Van der Heuel | 137/883 X |
| 2,106,723 | 2/1938 | Collison | 251/279 X |
| 2,631,613 | 3/1953 | Bergstrom | 251/279 |
| 2,818,091 | 12/1957 | Rafferty | 251/303 X |
| 2,895,498 | 7/1959 | Waite, Jr. et al. | 137/320 |
| 2,898,128 | 8/1959 | Shohan | 137/561 R |
| 2,951,498 | 9/1960 | Carver | 137/343 |
| 3,186,431 | 6/1965 | Moore | 137/561 R |
| 3,319,650 | 5/1967 | Peterson | 137/561 R |
| 3,334,858 | 8/1967 | Hay | 251/298 X |
| 3,481,365 | 12/1969 | Keen | 137/883 |
| 3,516,638 | 6/1970 | Piggott | 137/883 X |
| 3,724,809 | 4/1973 | Reale | 251/298 X |
| 3,757,726 | 9/1973 | Moeller | 251/298 X |
| 3,880,189 | 4/1975 | Bennett | 137/883 |
| 4,460,059 | 2/1981 | Crawford | 251/279 |
| 4,477,051 | 10/1984 | Ben-Yehuda | 251/298 X |
| 4,480,812 | 11/1984 | Carpentier | 251/298 X |
| 4,834,143 | 5/1989 | Bauat | 137/883 X |
| 5,113,895 | 5/1992 | Le Devehat | 137/883 X |
| 5,148,831 | 9/1992 | Kennedy | 251/267 X |

*Primary Examiner*—John Rivell

[57] ABSTRACT

A valve and fitting apparatus to control flow of fluid. The apparatus includes a main line to allow fluid flow therethrough and a branch line in fluid communication with the main line to allow fluid flow through the branch line in a single direction. A plate is pivotally operable to move between an open position and a closed position at an acute angle to the flow in the branch line. A stem assembly mechanism pivots the plate between the open position and the closed position.

4 Claims, 6 Drawing Sheets

ANGLED SEAT VALVE AND FITTING APPARATUS

BACKGROUND OF THE INVENTION

1. Field of the Invention

The present invention is directed to a combined fitting and valve to control and distribute fluid flow. In particular, the present invention is directed to a combined fitting and valve having an angled seat so that the fluid pressure assists to make and secure the seal.

2. Prior Art

Existing devices have been employed which combine a valve and a fitting, such a T-connection fitting to distribute and control the flow of fluid therethrough. Some of these prior devices have utilized gate valves. Often times these gate valves will not be able to take advantage of the pressure created by the fluid flow to maintain and create a seal to close the valve. Even when the fluid pressure is utilized to maintain and create a seal, the gate valve will frequently rub against the seat or fitting because of the fluid pressure and thereby be subject to wear.

Other types of known valves include free-swinging flapper valves which are not mechanically opened and closed but simply allow flow in one direction but prevent flow in a reverse direction. In many, these are used to prevent fluid flow reversal.

One use of the present invention is in a water distribution system which is constructed of a grid of connecting water lines designed to flow in a specified direction. Certain parts of the grid system have flow in one direction--such as dead end lines on a street and lines to fire hydrants. Each of these situations requires a mechanical valve that may be opened and closed.

It is a principal object and purpose of the present invention to provide a combined fitting and valve apparatus to distribute and control fluid flow to a branch line.

It is a further object and purpose of the present invention to provide a combined fitting and valve apparatus wherein pressure created by the fluid flow assists in creating and maintaining a seal when in the closed position.

It is an additional object and purpose of the present invention to provide a combined fitting and valve apparatus wherein a plate moveable between an open and closed position will be at an acute angle to the flow of fluid when in a closed position.

SUMMARY OF THE INVENTION

The present invention provides a valve and fitting apparatus to control and distribute the flow of water or other fluids.

The apparatus includes a body having a first pipe or main line and a branch line or second pipe in fluid communication with the main line. Fluid flow through the main line will be allowed to enter the branch line and travel in a single direction from the main line.

A plate is pivotally movable between an open position, allowing the fluid flow through the branch line, and a closed position restricting flow through the branch line. In the open position, the plate is substantially parallel to the flow of the fluid in the branch line.

The plate includes an extending ear having an opening therethrough perpendicular to the axis to the branch line. The bonnet includes an extending shoulder parallel to the ear opening of the plate. A pin extends through an opening in the shoulder and also extends through an opening in the plate so that the plate is pivotally movable about the end. The plate will, thus, be allowed to move radially within the branch line about the end.

A stem assembly extends from within the bonnet from the opening of the bonnet and terminates outside of the bonnet. A pair of links pivotally connects the stem assembly with the plate. The links are pivotally connected at one end to the plate ear and pivotally connected at the opposite end to a stem nut.

The operator nut has a cylindrical recess perpendicular to the flow through the branch line. A stem having external threads is received in the stem nut. The stem extends through the bonnet opening and through an opening in a bonnet cap so that the stem may be rotated externally. Rotation of the stem causes linear movement of the stem nut.

The interior of the branch line includes a shoulder which forms a seat so that the plate will mate with the seat when in a closed position. When in the closed position, the plate is at approximately a 60° angle from the flow of fluid in the branch line.

DETAILED DESCRIPTION OF THE PREFERRED EMBODIMENT

Figure 1:
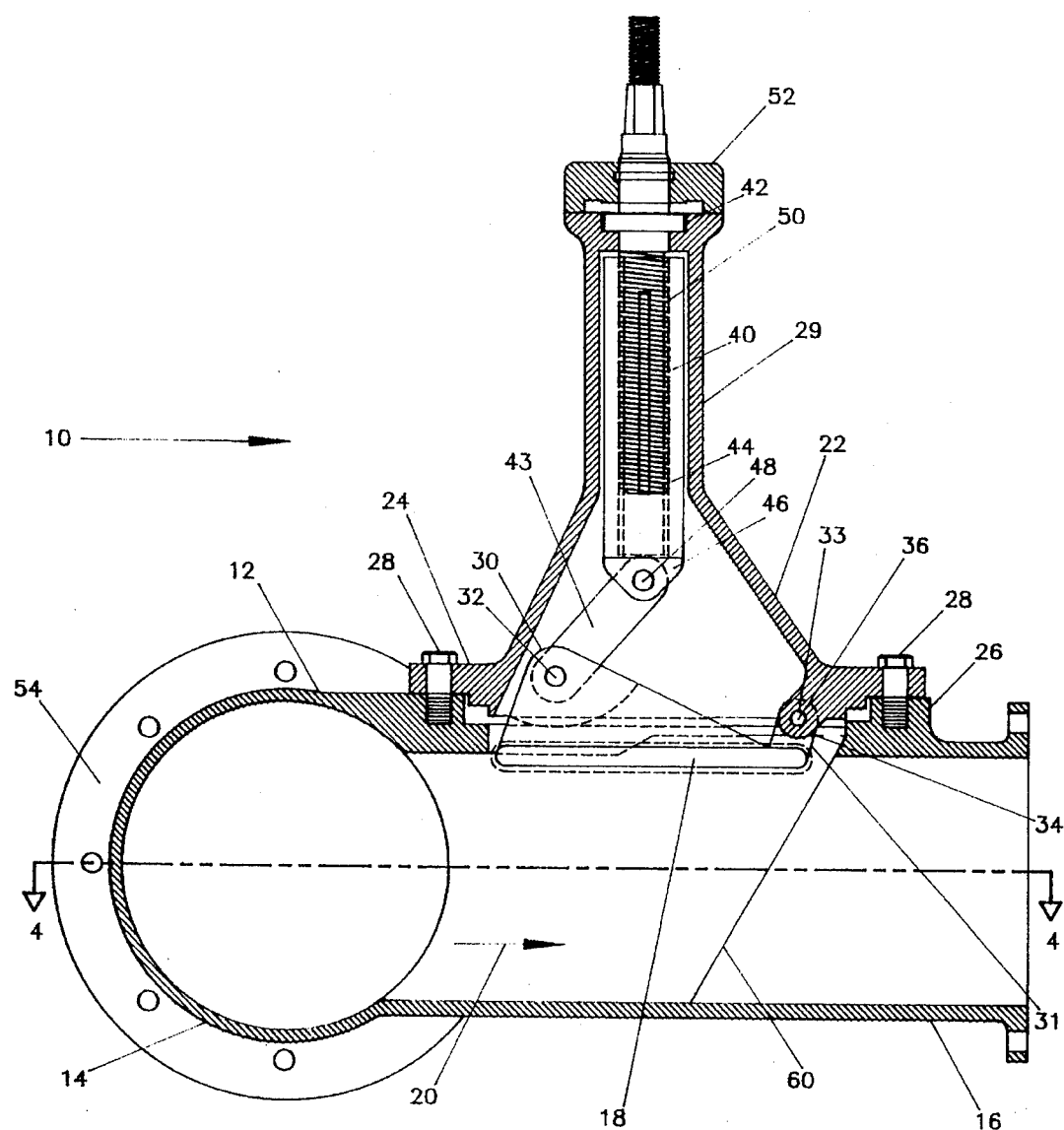
FIG. 1 is a partial sectional view of an angled seat valve and fitting apparatus constructed in accordance with the present invention.

Referring to the drawings in detail, FIG. 1 illustrates a partial sectional view of a valve and fitting apparatus 10 constructed in accordance with the present invention. The apparatus may be used to control the distribution and flow of water or other fluids.

The apparatus includes a body 12 having a first pipe or main line 14 which permits fluid flow therethrough.

The body may be constructed of ductile iron or other sturdy material and may be coated with a petroleum-asphaltic material such as epoxy. A branch line or second pipe 16 is in fluid communication with the main line in order to allow fluid flow in the main line to enter the branch line and travel in a single direction from the main line.

As an example, the main line and branch line may have diameters ranging from 3 to 16 inches.

In the present embodiment, the branch line 16 extends perpendicularly in the same plane from the main line 14 although other design arrangements are possible. A plate 18 is pivotally moveable in order to move between an open position, allowing fluid flow through the branch line, and a closed position, restricting flow through the branch line. The plate 18 is shown in the open position in FIG. 1. In the open position, the plate 18 is substantially parallel to the flow of fluid in the branch line as illustrated by arrow 20.

The plate 18 is covered with a resilient material such as a rubber material bonded to the exterior of the plate. As will be seen herein, the plate works with a shoulder to form a resilient seat.

Extending upward vertically from the branch line 16 is a bonnet 22. The bonnet terminates at one end in a circular flange 24 which connects to a circular flange 26 of the branch line 16 through a series of bolts 28 or other fasteners. It will be understood that other methods of connection between the branch line and the bonnet.

The bonnet 22 extends from the circular flange 24 in a cone and terminates in a cylindrical portion 29.

As may be observed in FIG. 1, when the plate 18 is in the open position, it does not obstruct the flow of water through the branch line. Accordingly, a full volume of water or other fluid may be passed through the branch line 16 when in the open position. Additionally, if other equipment such as pigging or testing equipment is required to be passed through the apparatus, the plate 18 will not interfere therewith.

The plate 18 includes an anchor ear 31 which is perpendicular to the axis of the branch line 16 and an opening 33 which is perpendicular to the anchor ear 31. The bonnet includes an extending shoulder 34 parallel to the anchor ear opening 33 on the plate. A pin 36 extends through an opening in the shoulder 34 and extends through an opening 33 in the anchor ear in plate 18 so that the plate is pivotally movable about the pin 36. The plate will, thus, be allowed to move radially within the branch line about the pin 36.

A stem assembly 40 including a stem 50 and a stem nut 44, extends from within the bonnet through an opening 42 in the bonnet and terminating outside of the bonnet. A pair of links 43 pivotally connect the stem assembly 40 with the plate 18. The plate 18 includes an extending web 30 which is perpendicular to the axis of the branch line and the opening 32 is perpendicular to the web 30. The links 43 are pivotally connected at one end to the plate web 30 forming a fixed hinge point and pivotally connected at the opposite end to a yoke 46 through an opening 48 in stem nut 44 forming a fixed hinge point.

The stem nut 44 has a cylindrical recess perpendicular to the flow through the branch line. A stem nut 50 having external threads is received in the operator nut. The stem 50 extends through the bonnet opening 42 and through an opening in a bonnet cap 52 so that the stem may be rotated from outside the bonnet and bonnet cap. As will be seen herein, rotation of the stem causes linear movement of the stem nut.

Figure 2:
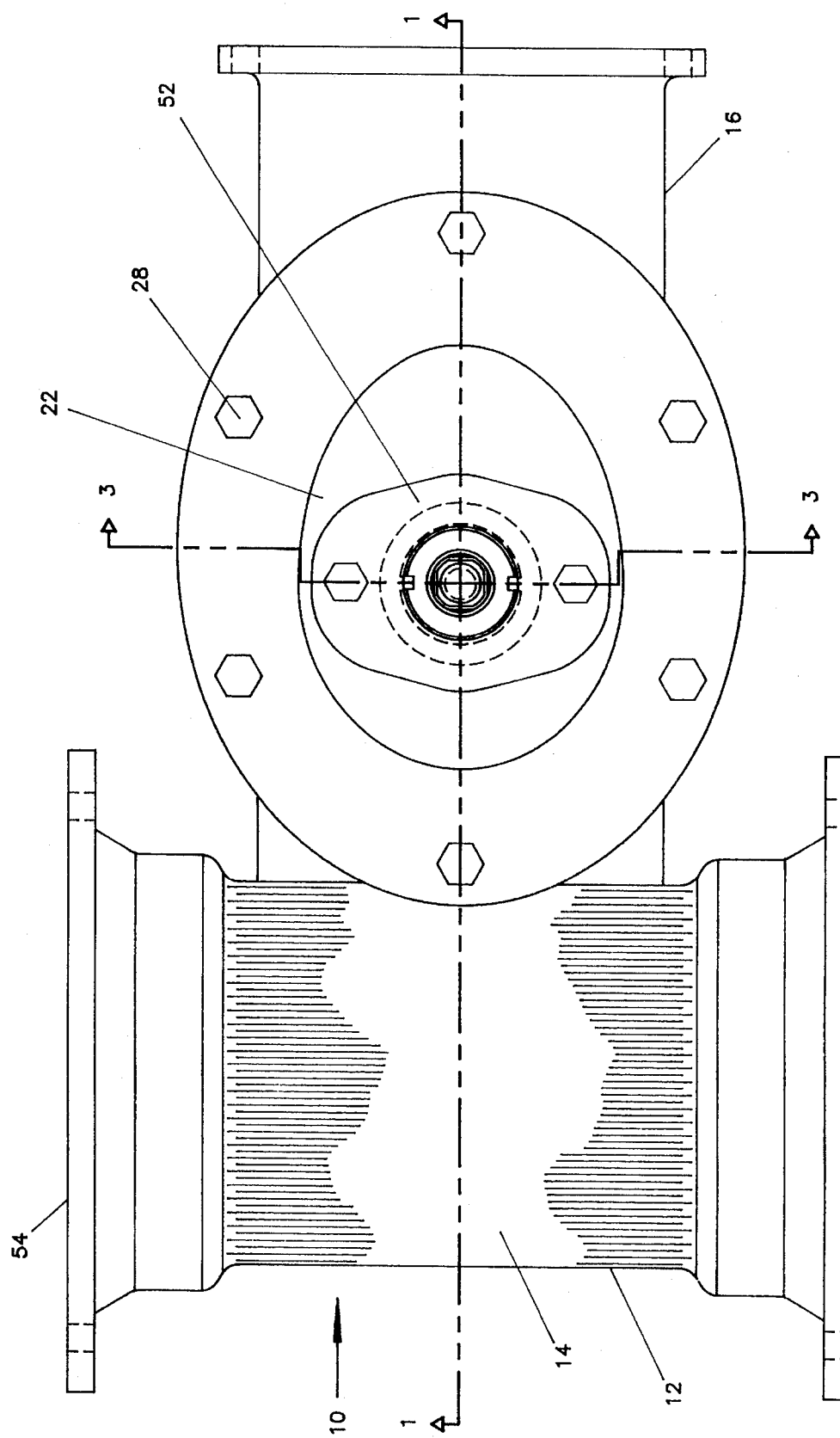
FIG. 2 is a top view of the fitting and valve apparatus shown in FIG. 1.

FIG. 2 illustrates a top view of the fitting and valve apparatus shown in FIG. 1. The main line 14 includes an input 54 and output 56 for receipt and distribution of fluid. The main line 14 may be connected to other parts of a fluid control and distribution system by flanges such as shown in the present embodiment, by threaded connections, or other known connections. Likewise, the output 58 of the branch line 16 may be connected to other pipes by a flange such as shown in the present connection or other connection.

Figure 3:
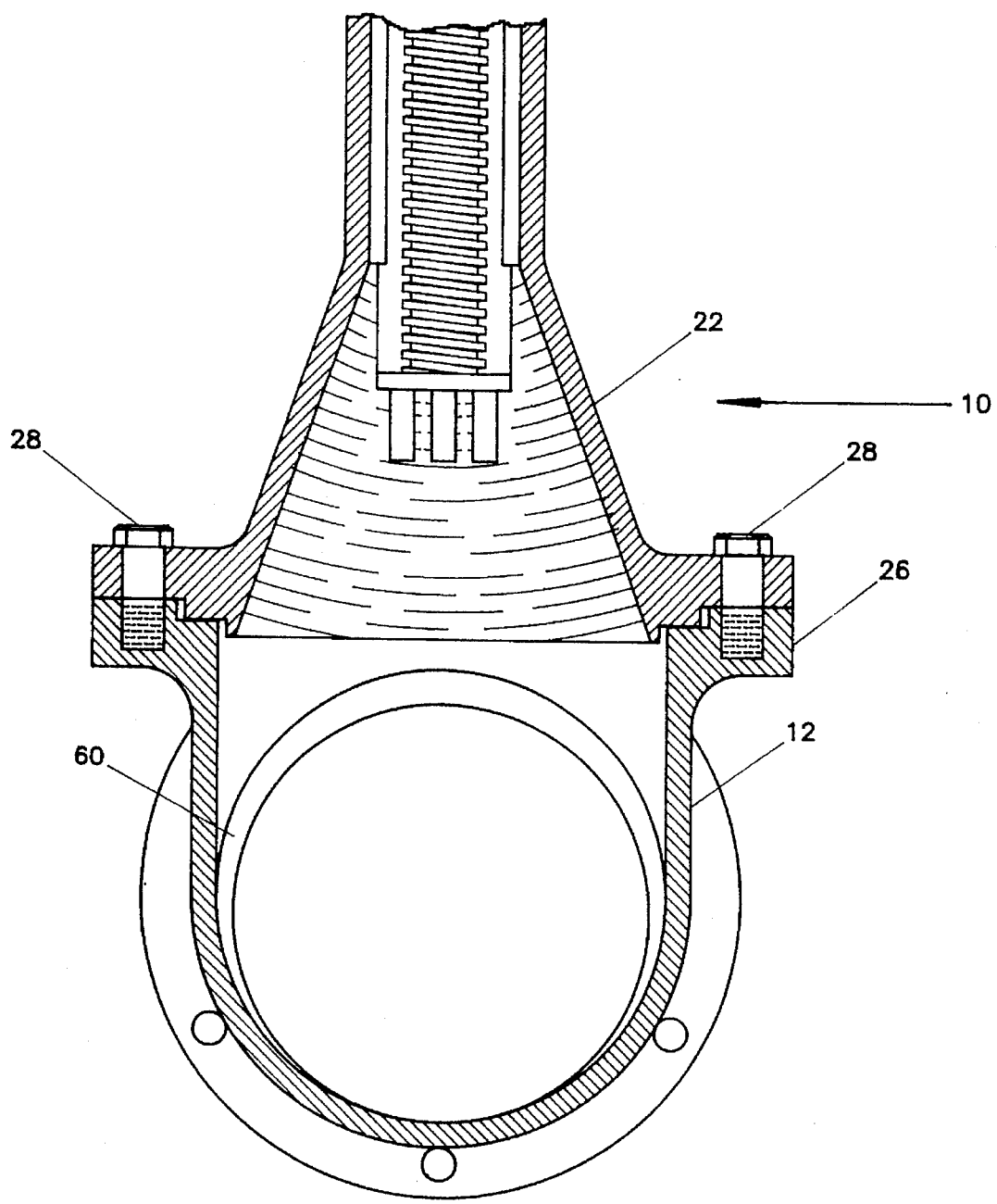
FIG. 3 is a sectional view taken along section line 3—3 of FIG. 2.

The connection between the bonnet 22 and the branch line 16 may be readily observed in FIGS. 2 and 3 by bolts or other known fasteners.

FIG. 3 is a sectional view taken along section line 3—3 of FIG. 2. When the plate is in the fully open position, the plate does not interfere with or obstruct the passage of fluid. As seen in both FIGS. 3 and 4, the interior of the branch line includes a shoulder 60 which forms a seat so that the plate will mate with the seat when in the closed position. The shoulder 60 is elliptical in shape to conform to the configuration of the plate. As seen in FIG. 3 (and also in FIG. 4), the shoulder 60 is formed by the offset between an annular opening having an internal diameter equal to the branch line pipe internal diameter and second annular opening which has a larger diameter than and is eccentric to the internal branch line pipe diameter. The shoulder 60 blends into the internal diameter of the branch line near the base of the lower quadrant of the branch line.

Figure 4:
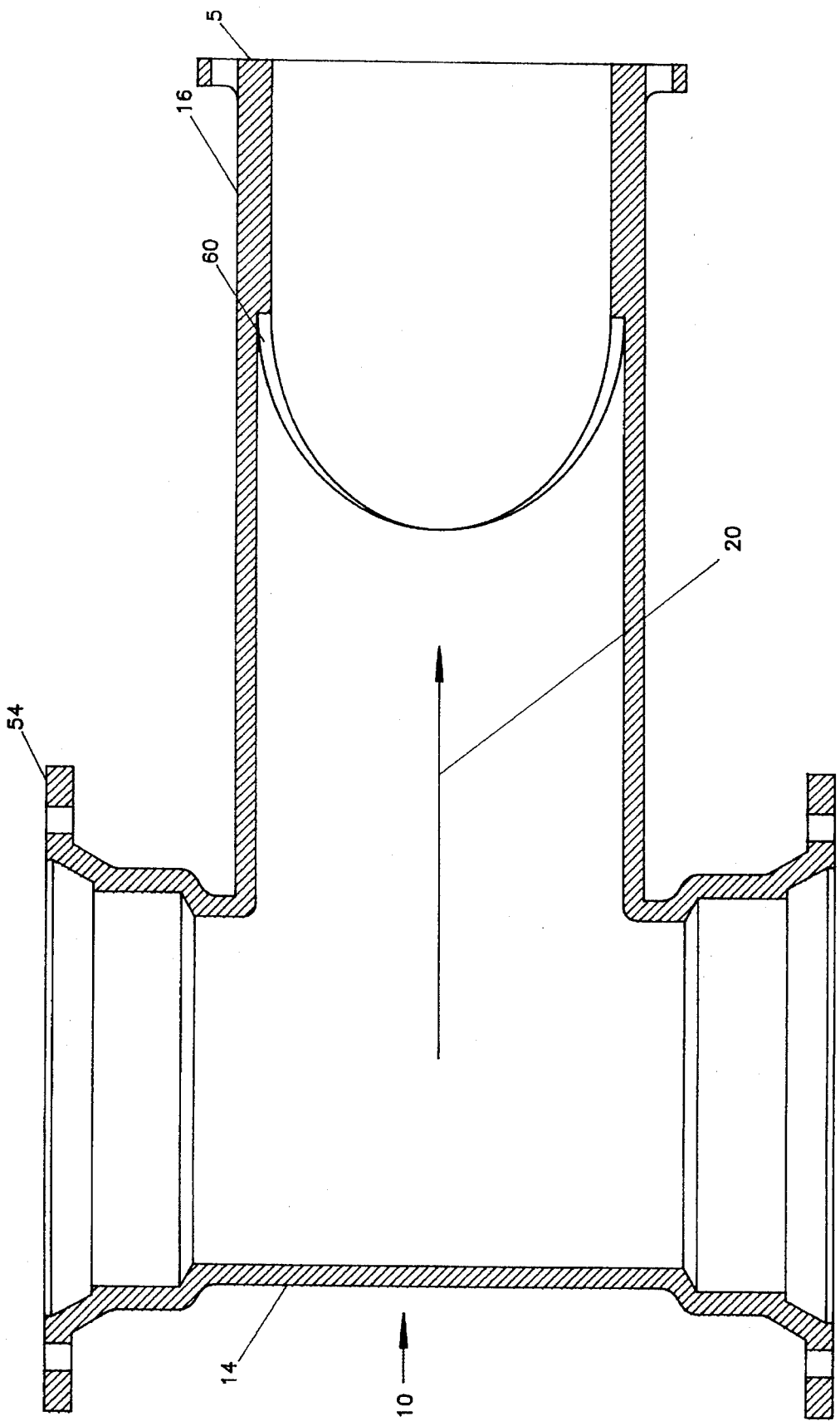
FIG. 4 is a sectional view taken along section line 4—4 of FIG. 1.

FIG. 4 is a sectional view taken along section line 4—4 of FIG. 1.

Figure 5:
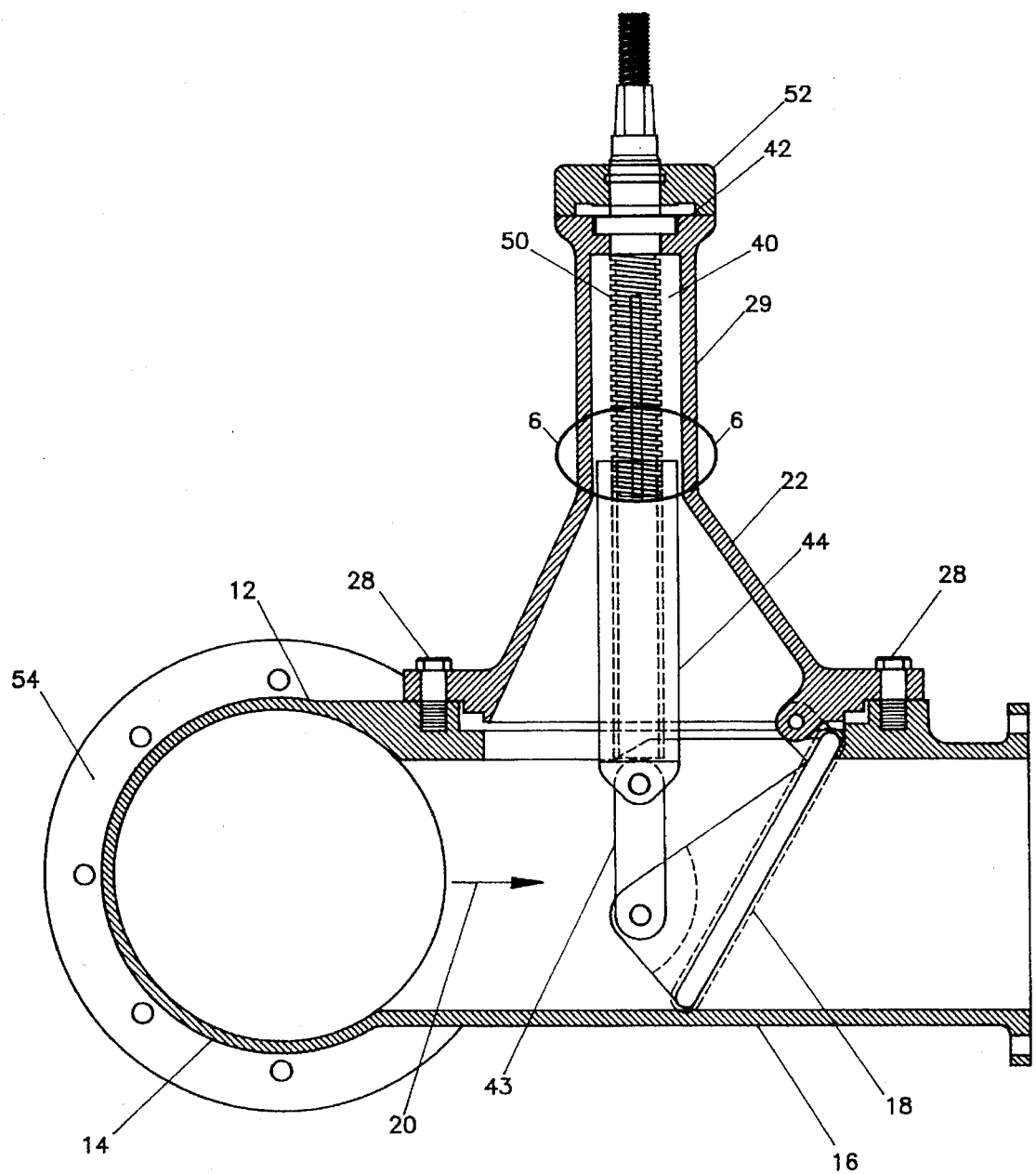
FIG. 5 is a partial sectional view similar to that shown in FIG. 1 with the apparatus in the closed position.

FIG. 5 is a sectional view of the apparatus 10 similar to the view in FIG. 1 with the plate 18 moved to the fully closed position.

It has been found that the force required to close and maintain a good seal with the present invention is less than the force required than other types of valves, such as gate valves having a disk moving perpendicular to the flow of fluid in the branch line.

When the plate 18 is in the fully closed position, as seen in FIG. 5, the plate is approximately at a 60° angle to the flow of fluid. This closed plate angle has been found to provide the optimum combination of assisted sealing force and relatively low opening torque.

Rotation of the stem 50 will cause the stem nut 44 to move linearly. Rotation of the stem in one direction will move the stem nut toward the branch line while rotation of the nut in the opposite direction will move the stem nut away from the branch line. As the stem nut 44 moves toward the branch line 16, the plate 18 will be caused to move radially through movement of the pivotal links 43. In the fully closed position, the plate 18 will rest against the shoulder 60 visible in FIG. 4.

Figure 7:
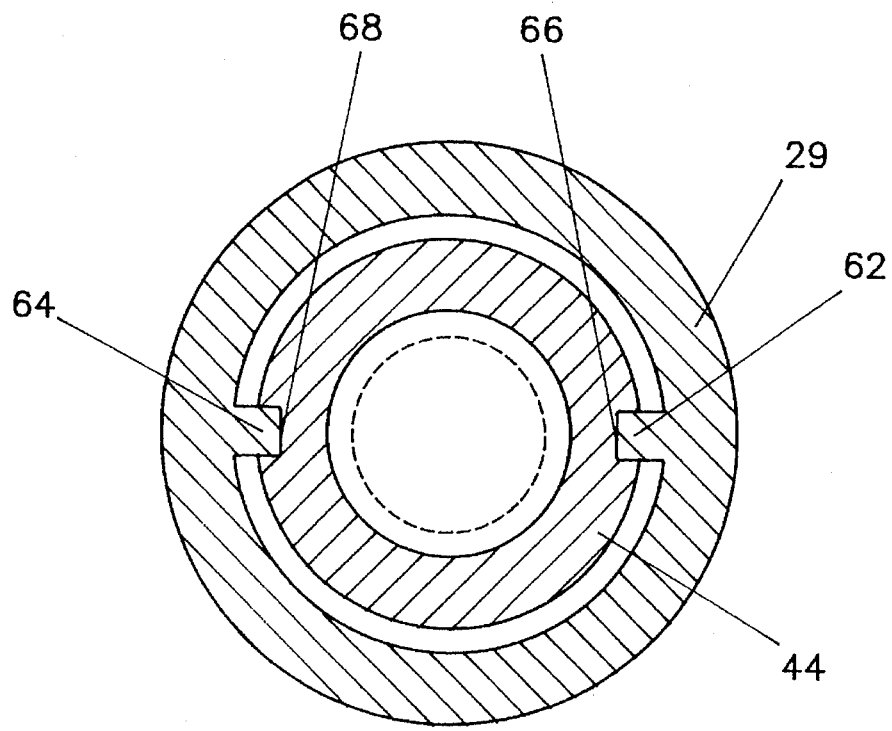
FIG. 7 is a sectional view taken along section line 7—7 of FIG. 6.
Figure 6:
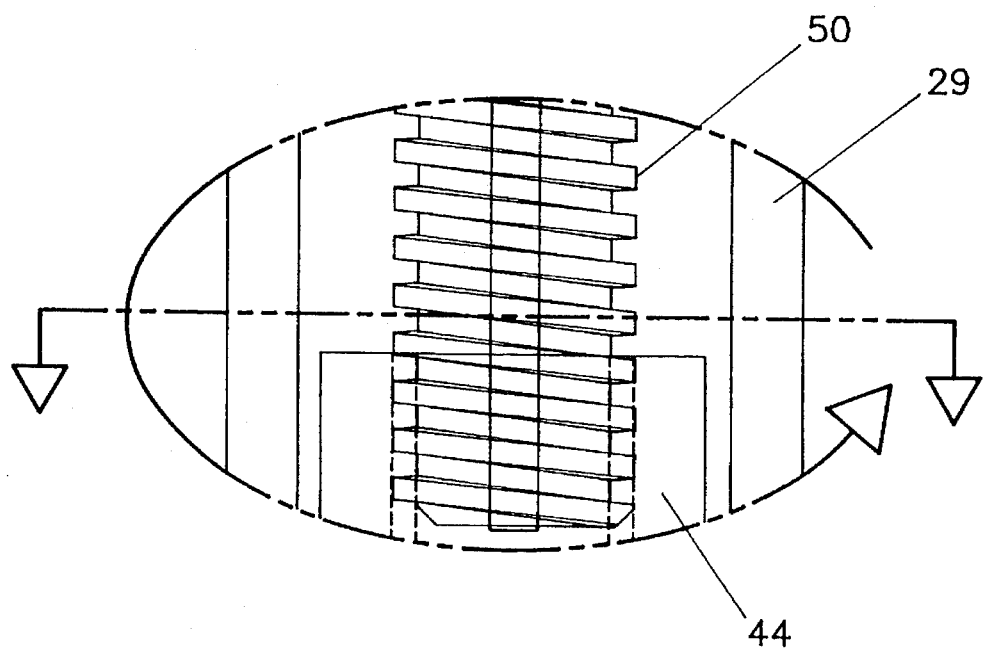
FIG. 6 is an enlarged view of a portion shown in FIG. 5.

FIG. 6 illustrates an enlarged view of a portion shown by the elliptical line in FIG. 5. The connection between the stem nut 44 and the stem 50 may be readily viewed. As seen in FIG. 7, the upper end of the bonnet 22 has a pair of opposed flanges 62 and 64 that extend inwardly. The flanges 62 and 64 reside in a pair of corresponding channels 66 and 68 in the exterior of the stem nut. The stem nut 44 will thus, be restricted from rotational movement so that rotation of the stem 50 will cause a linear movement of the stem nut 44.

Whereas, the present invention has been described in relation to the drawings attached hereto, it should be understood that other and further modifications, apart from those shown or suggested herein, may be made within the spirit and scope of this invention.

What is claimed is:

1. A valve and fitting apparatus to control flow of fluid, which apparatus comprises:

a main line to allow fluid flow therethrough;

a branch, having an internal diameter, in fluid communication with said main line to allow fluid flow through said branch line in a single direction;

a plate pivotally operable to move between an open position and a closed position at an acute angle to said flow in said branch line;

an interior shoulder in said branch line for receiving said plate in said closed position, said shoulder blending into the internal diameter of said branch line; and means to pivot said plate between said open position and said closed position.

2. A valve and fitting apparatus as set forth in claim 1 wherein said interior shoulder is elliptical in shape.

3. A valve and fitting apparatus to control flow of fluid, which apparatus and fitting comprises:

a main line to allow fluid flow therethrough;

a branch line in fluid communication with said main line to allow fluid flow through said branch line in a single direction;

a plate pivotally operable to move between an open position and a closed position at an acute angle to said flow in said branch line;

means to pivot said plate between said open position and said closed position;

a bonnet extending from said branch line;

a stem extending through said bonnet; and a link pivotally connecting said stem forming a first hinge point and pivotally connecting said plate forming a second hinge point, whereby movement of said stem moves said plate;

said stem including a threaded stem and a stem nut threadably engaging said stem and wherein said bonnet has at least one flange extending internally in axial alignment with said threaded stem and said flange is received in a channel in said stem nut so that rotational movement of said stem produces linear movement of said nut.

4. A valve and fitting apparatus to control flow of fluid as set forth in claim 3, wherein said open position of said plate provides no obstruction to the flow or passage through said branch line; and wherein said closed position of said plate is at approximately 60 degrees from the direction of flow of fluid in said branch line.

* * * * *